United States Patent
Braylovskiy et al.

(10) Patent No.: US 9,477,284 B1
(45) Date of Patent: Oct. 25, 2016

(54) MINIMIZING POWER LOSS

(75) Inventors: Michael Braylovskiy, San Mateo, CA (US); Jaspal Gill, Tracy, CA (US); David Owen, Livermore, CA (US)

(73) Assignee: Juniper Networks Inc., Sunnyvale, CA (US)

( * ) Notice: Subject to any disclaimer, the term of this patent is extended or adjusted under 35 U.S.C. 154(b) by 940 days.

(21) Appl. No.: 13/208,889

(22) Filed: Aug. 12, 2011

(51) Int. Cl.
*G06F 1/32* (2006.01)

(52) U.S. Cl.
CPC ..................................... *G06F 1/32* (2013.01)

(58) Field of Classification Search
None
See application file for complete search history.

(56) References Cited

U.S. PATENT DOCUMENTS

| | | | | |
|---|---|---|---|---|
| 6,118,640 A | * | 9/2000 | Kwong | 361/56 |
| 6,904,541 B1 | * | 6/2005 | MacArthur et al. | 714/14 |
| 2006/0125452 A1 | * | 6/2006 | Hsieh | G05F 1/46 323/234 |
| 2009/0164806 A1 | * | 6/2009 | Dishman et al. | 713/300 |
| 2011/0221270 A1 | * | 9/2011 | Chung et al. | 307/29 |

* cited by examiner

*Primary Examiner* — Paul Yanchus, III
(74) *Attorney, Agent, or Firm* — Harrity & Harrity, LLP

(57) ABSTRACT

A device determines a first received power via a first input feed of a circuit board, and determines a second received power via a second input feed of the circuit board. The device further determines whether the first input feed and the second input feed are receiving power based on the first received power and the second received power. The device opens a switch, of the circuit board, when the first input feed and the second input feed are receiving power.

20 Claims, 4 Drawing Sheets

MINIMIZING POWER LOSS

BACKGROUND

Power systems of network devices (e.g., switches, routers, etc.) require high reliability. As a result, the power systems utilize two parallel, independent, direct current (DC) input voltage feeds in order to maintain input redundancy. Because the input DC input voltage feeds, usually, do not provide equal voltage, nearly all the current is drawn from only one of the two DC input voltage feeds with the higher voltage. The greater the amount of current that is drawn from one of the two DC input voltage feeds, the greater the power loss.

SUMMARY

According to one aspect, a method may include: determining, by a device, a first received power via a first input feed of a circuit board of the device; determining, by the device, a second received power via a second input feed of the circuit board; determining, by the device, whether the first input feed and the second input feed are receiving power based on the first received power and the second received power; and opening, by the device, a switch, of the circuit board, when the first input feed and the second input feed are receiving power.

According to another aspect, a device may include a circuit board. The circuit board may include: a first input bus to receive a first power from a first power source; a second input bus to receive a second power from a second power source; a switch to connect, when the switch is closed, the first input bus to the second input bus; and a logic element. The logic element may determine whether the first input bus is receiving the first power, may determine whether the second input bus is receiving the second power, and may close the switch when the first input bus is not receiving the first power or when the second input bus is not receiving the second power.

According to yet another aspect, a logic element, of a printed circuit board (PCB), may include: a first input to receive a first input signal from a first input bus of the PCB; a second input to receive a second input signal from a second input bus of the PCB; and an output to transmit an output signal, based on the first input signal and the second input signal, to a control input of a switch that connects, when the switch is closed, the first input bus to the second input bus. The output signal may include an open control value, to open the switch, when the first input signal indicates that the first input bus is receiving power from a first power source and the second input signal indicates that the second input bus is receiving power from a second power source.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

An embodiment, described herein, may minimize power loss when a printed circuit board (PCB) has two input feeds (e.g., which are connected to two different power sources) that supply power. The PCB may include a first input bus, a second input bus, a logic element, and a switch between the first input bus and the second input bus. The first input bus may operate as a first input feed from a first power source. The second input bus may operate as a second input feed from a second power source, which is different from the first power source. The logic element may determine whether the PCB is receiving power via both the first input feed and the second input feed or only via one of the input feeds (e.g., via the first input feed or via the second input feed).

The logic element may open the switch when the PCB is receiving power via both the first input feed and the second input feed. When the switch is open, the PCB may receive a first half of the power needed by the PCB via the first input feed and a second half of the power needed by the PCB via the second input feed. As a result, the power loss is almost twice as less when the switch is open than when the PCB receives most of the power only via one of the input feeds. In other words, the power loss from drawing all the current from a single power source is about twice as great as drawing one half of the current from the first single power source and the other half of the current from the second single power source.

The logic element may close the switch when the PCB is receiving power only via one of the input feeds. When the switch is closed, the PCB may receive all of the power needed by the PCB via the one of the input feeds that is receiving power (e.g., via the power received by the first input bus from the first power source). The logic element may re-open the switch when the logic element determines that the PCB is (again) receiving power via both the first input feed and the second input bus (e.g., power is restored from one of the power sources and is now being received from both power sources).

Figure 1:
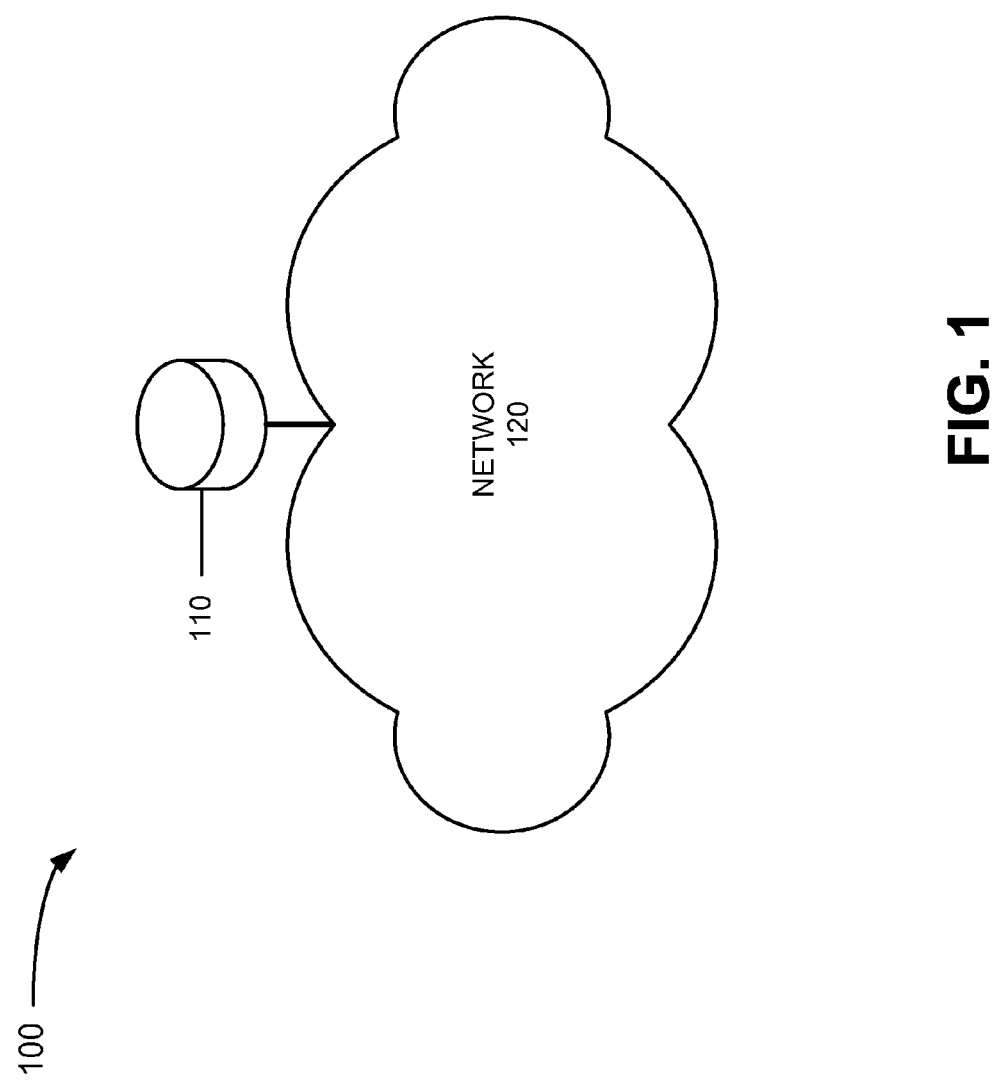
FIG. 1 is a diagram of an example environment in which systems and/or methods described herein may be implemented.

FIG. 1 is a diagram of an example environment 100 in which systems and/or methods described herein may be implemented. Environment 100 may include a device 110 and a network 120. Device 110 may include any device with a PCB that receives power. For example, device 110 may include a network device for performing network-related functions, such as a router, a server, or a switch. Alternatively, device 110 may include a computing device, a communication device, etc., that communicates via network 120. Network 120 may include the Internet, an ad hoc network, a local area network (LAN), a wide area network (WAN), a metropolitan area network (MAN), a cellular network, a public switched telephone network (PSTN), any other network, or a combination of networks. Device 110 may communicate with other devices (not shown) and may communicate through wired and/or wireless communication links via network 120.

Figure 2A:
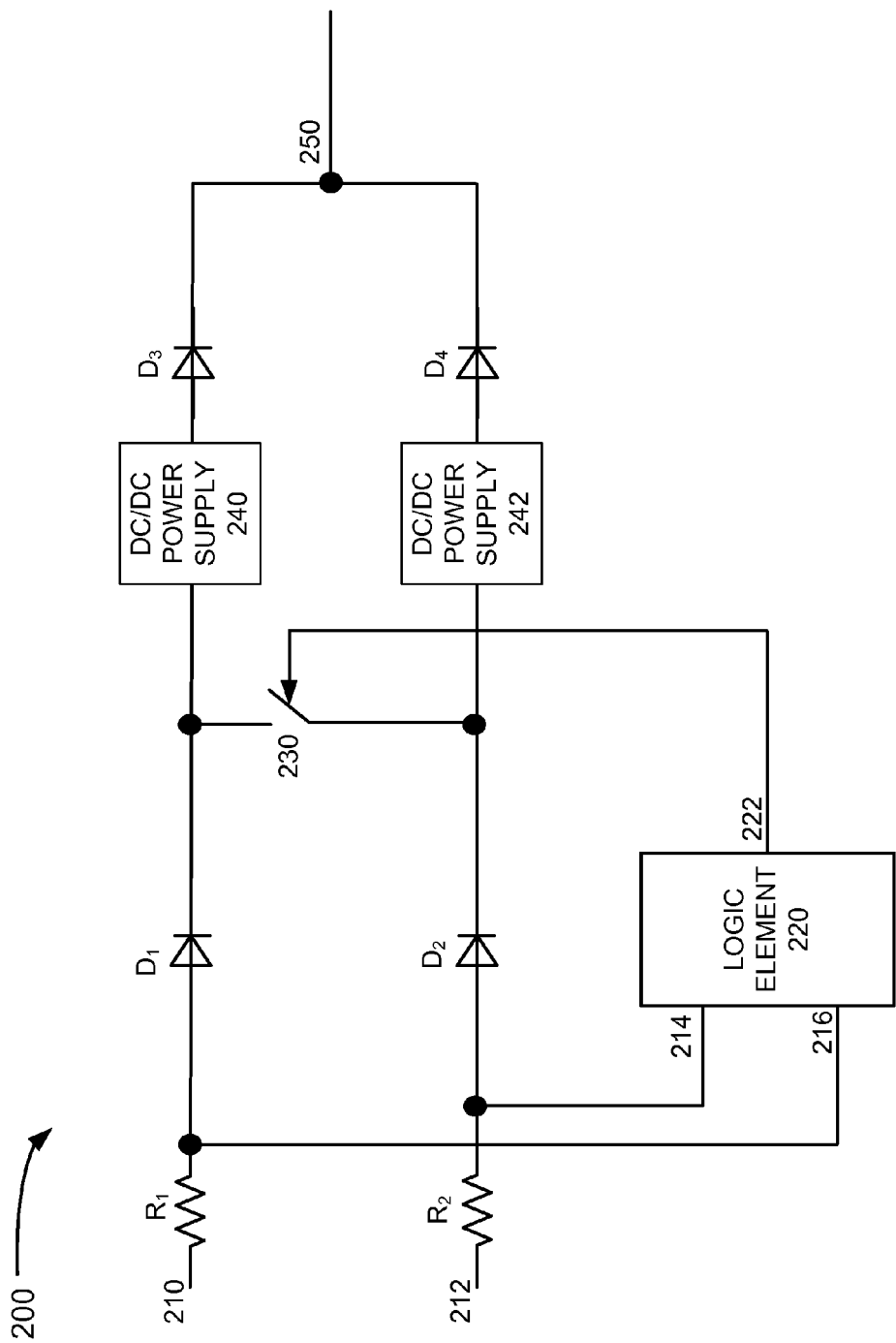
FIGS. 2A and 2B are diagrams of example circuitry included in a portion of a printed circuit board (PCB) of a device illustrated in FIG. 1.
Figure 2B:
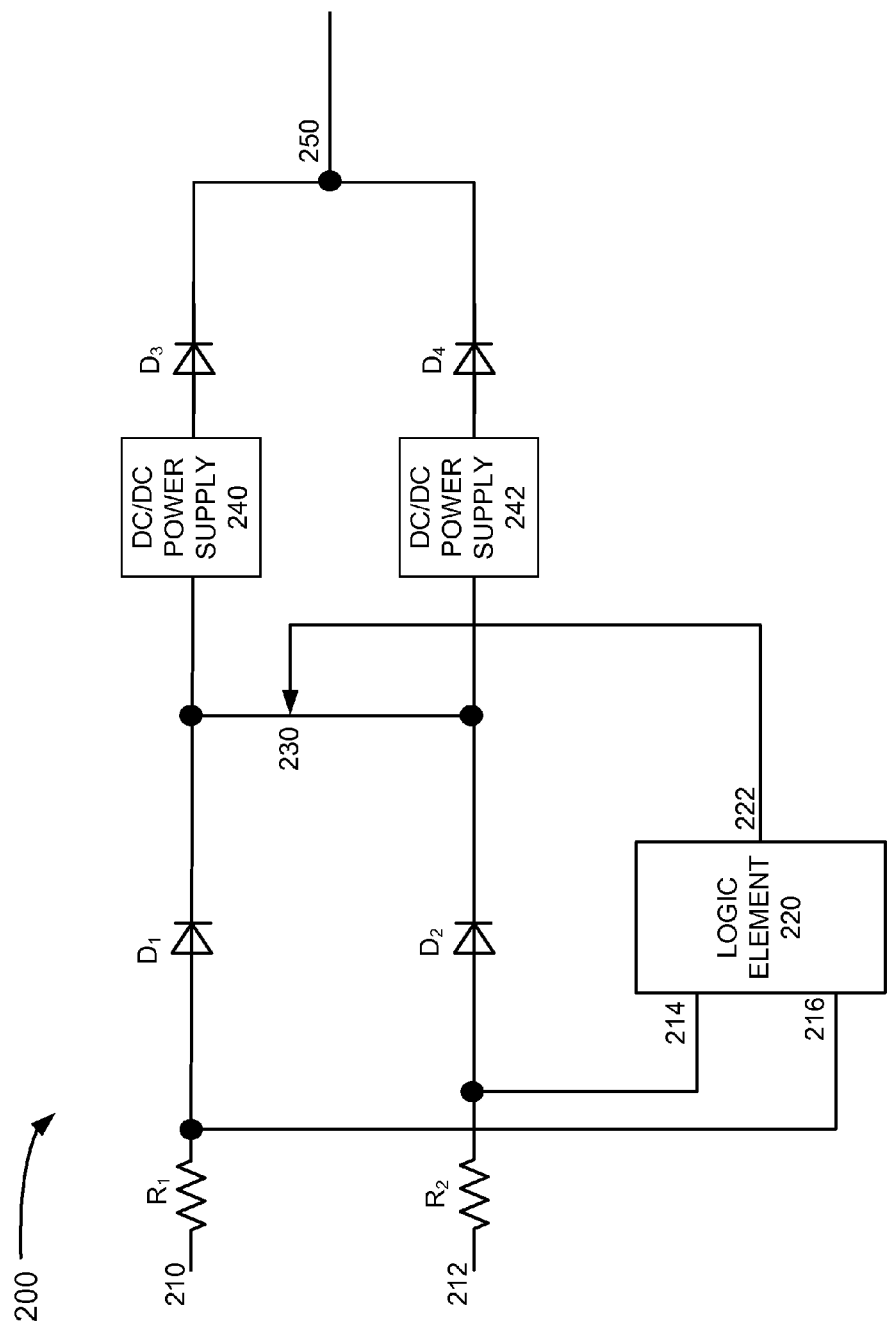

FIGS. 2A and 2B are diagrams of example circuitry included in a portion 200 of a printed circuit board (PCB) of device 110. As show in FIG. 2A, portion 200 may include an input bus 210, an input bus 212, a resistor $R_1$, a resistor $R_2$, a diode $D_1$, a diode $D_2$, a diode $D_3$, a diode $D_4$, a logic element 220, a switch 230, a direct current (DC)/DC power supply 240, a DC/DC power supply 242, and an output bus 250. In practice, portion 200 may include more components, fewer components, different components, and/or differently arranged components.

Input bus 210 may include any component that may receive power (e.g., a current of voltage, I) from a power source and transmit the power to other components of the PCB (e.g., DC/DC power supply 240). In one implementation, input bus 210 may operate as an input feed. Input bus 210 may receive power from a source outside of the PCB (or from another portion of the PCB). The power may include, for example, an input voltage of a particular DC voltage. When switch 230 is open (FIG. 2A), the PCB may receive half of the power needed by the PCB (e.g., to transmit via output bus 250 to other components of the PCB) via input bus 210. When switch 230 is closed (FIG. 2B), the PCB may receive all of the power needed by the PCB or no power via input bus 210.

Input bus 212 may include any component that may receive power from a power source and transmit the power to other components of the PCB (e.g., DC/DC power supply 242). In one implementation, input bus 212 may operate as an input feed. Input bus 212 may receive power from a source outside of the PCB (or from another portion of the PCB) that is different from the source that provides power to the PCB via input bus 210. When switch 230 is open (FIG. 2A), the PCB may receive half of the power needed by the PCB via input bus 212. When switch 230 is closed (FIG. 2B), the PCB may receive all of the power needed by the PCB or no power via input bus 212.

Resistors, including resistor $R_1$ and resistor $R_2$, may act as DC resistive impedance from one DC input voltage feed. Diode $D_1$ may connect a first DC input voltage feed to the input of DC/DC power supply 240 via input bus 210. Diode $D_2$ may connect a second DC input voltage feed to the input of DC/DC power supply 242 via input bus 212. In one implementation, diodes, including diode $D_1$ and diode $D_2$, may include "OR" diodes that isolate particular voltage(s). In another implementation, diodes, including diode $D_1$ and diode $D_2$, may prevent shorting between input bus 210 and input bus 220. In yet another implementation, diodes, including diode $D_3$ and diode $D_4$, may ensure that a full amount of (output) power, which is required to be provided from DC/DC power supply 240 and DC/DC power supply 242, is maintained at output bus 250.

DC/DC power supply 240 may include any component that functions as a DC/DC converter. In one implementation, DC/DC power supply 240 may receive power received by input bus 210 via diode $D_1$. Resistor $R_1$ may contribute to an impedance (e.g., "R") of input bus 210 that results in a power loss (e.g., "P"). Power loss may equal a product of a value of the current received by input bus 210 and a value of the impedance (e.g., $P=I^2*R$). DC/DC power supply 240 may convert a received input DC voltage into another output DC voltage. A current flow of the output voltage may move across diode $D_3$ and to a different portion (e.g., different from portion 200)/other components of the PCB, via output bus 250. DC/DC power supply 240 may provide, via output bus 250, half of an amount of output DC voltage required by the other components.

DC/DC power supply 242 may include any component that functions as a DC/DC converter. In one implementation, DC/DC power supply 242 may receive power received by input bus 212 via diode $D_2$. Resistor $R_2$ may contribute to an impedance of input bus 212 that results in a power loss. Power loss may equal a product of a value of the current received by input bus 212 and a value of the impedance. DC/DC power supply 242 may convert a received input DC voltage into another output DC voltage. A current flow of the output voltage may move across diode $D_4$ and to the different portion/other components of the PCB, via output bus 250. DC/DC power supply 242 may provide, via output bus 250, the other half of the amount of output DC voltage required by the other components.

Logic element 220 may include any component that controls whether switch 230 is open (FIG. 2A) or closed (FIG. 2B). Logic element 220 may receive a first input signal 214 from input bus 210. Logic element 220 may determine, based on a value of first input signal 214, whether input bus 210 is receiving power from a first power source. Logic element 220 may receive a second input signal 216 from input bus 212. Logic element 220 may determine, based on a value of second input signal 216, whether input bus 212 is receiving power from a second power source. Logic element 220 may generate/produce, based on first input signal 214 and second input signal 216, an output signal 222.

Switch 230 may include any component that opens or closes (e.g., turns on or off) a connection between first input bus 210 and second input bus 212. Logic element 220 may transmit output signal 222 to switch 230. Switch 230 may open (FIG. 2A) or close (FIG. 2B) based on output signal 222. Logic element 220 may open switch 230, with output signal 222, when input bus 210 is receiving power from the first power source and input bus 212 is receiving power from the second power source. Logic element 220 may close (FIG. 2B) switch 230, with output signal 222, when only input bus 210 is receiving power or only input bus 212 is receiving power.

For example, the value of first input signal 214 may equal one (1) when input bus 210 is receiving power from the first power source. The value of first input signal 214 may equal zero (0) when input bus 210 is not receiving power from the first power source. Similarly, the value of second input signal 216 may equal one (1) when input bus 212 is receiving power from the second power source. The value of second input signal 216 may equal zero (0) when input bus 212 is not receiving power from the second power source. When logic element 220 determines that the value of a signal (e.g., first input signal 214 or second input signal 216) is equal to 0, a signal/power may not have been received from an input bus (e.g., input bus 210 or input bus 212). Logic element 220 may associate the value of 0 with the receipt of power by the input bus that operates as an input feed.

Furthermore, in one implementation, logic element 220 may act as/include an AND gate. Logic element 220 may generate output signal 222 based on a product of the value of first input signal 214 and the value of second input signal 216. Accordingly, a value of output signal 222 may equal 1 when the value of first input signal 214 is equal to 1 and the value of second input signal 216 is equal to 1. The value of output signal 222 may equal 0 when either the value of first input signal 214 or the value of second input signal 216 is equal to 0. Switch 230 may receive, from logic element 220, output signal 222. Switch 230 may open when the value of output signal 222 is equal to 1. Conversely, switch 230 may close (FIG. 2B) when the value of output signal 222 is equal to 0. In another implementation, logic element 220 may act include a microcontroller (MCU) that may open or close switch 230 based on the value of first input signal 214 and the value of second input signal 216.

Figure 3:
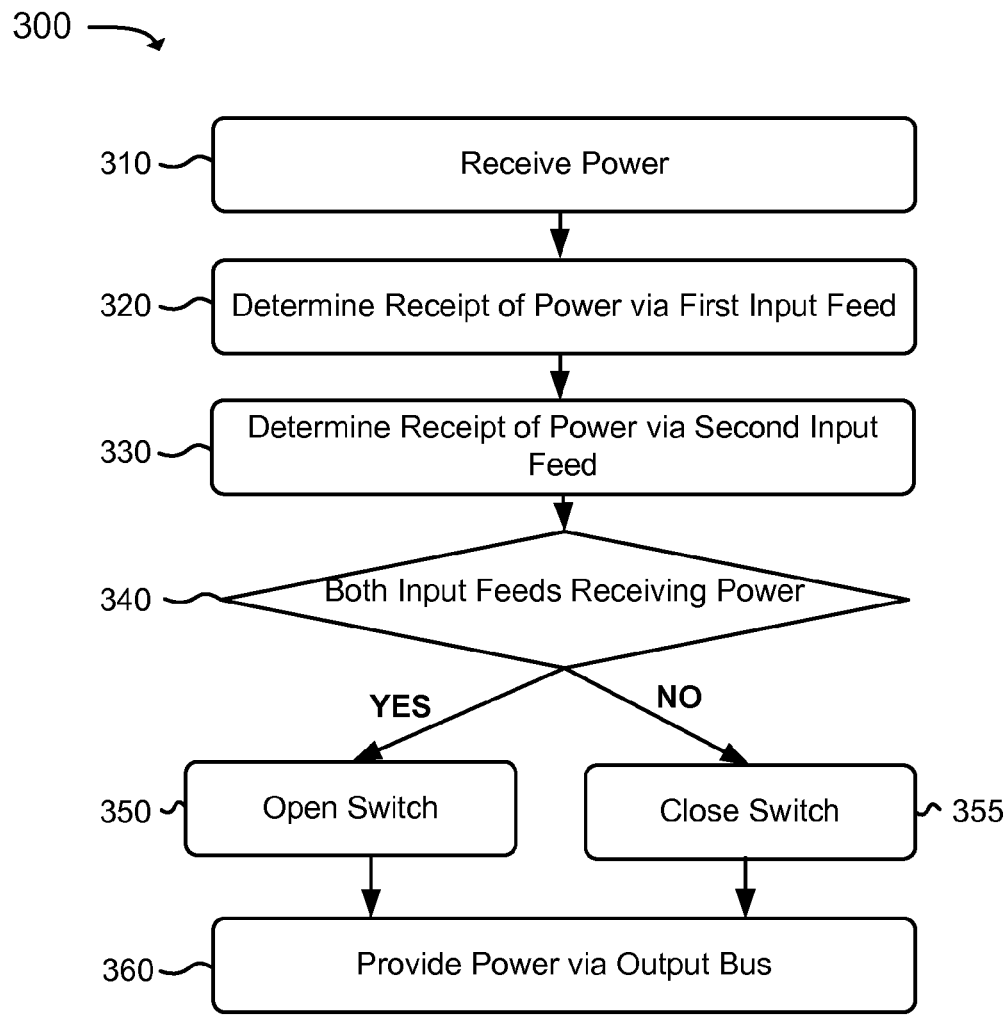
FIG. 3 is a flowchart of an example process for minimizing power loss.

FIG. 3 is a flowchart of an example process 300 for minimizing power loss in a device or a component of a device. In one implementation, device 110 may perform process 300. In other implementations, some or all of the process 600 may be performed by a component or a group of components separate and/or possibly remote from or including device 110.

As shown in FIG. 3, process 300 may include receiving power (block 310). For example, in one implementation, device 110 may connect input bus 210 to a first power source and connect input bus 212 to a second power source. In another implementation, controls of device 110, or controls of the first power source and the second power source, may be manipulated for portion 200 to receive power from the first power source and/or the second power source. Input bus 210 may receive power from the first power source and/or the second power source.

A receipt of power via a first input feed may be determined (block 320). For example, input bus 220 may operate as a first input feed by receiving the power from the first power source. A first input of logic element 220 may receive input signal 214 from input bus 210. Logic element 220 may determine that the first input feed is receiving power when a value of input signal 214 is equal to a first particular value (e.g., 1). Logic element 220 may determine that the first input feed is not receiving power when the value of input signal 214 is equal to a second particular value (e.g., 0). A value associated with the receipt of power, via the first input feed, may equal the first particular value or the second particular value.

In another implementation, the first input, of logic element 220, may receive first power, as first input signal 214, from input bus 210. Logic element 220 may determine a first voltage measurement of the first power. Logic element 220 may determine that input bus 210 is receiving the power when the first voltage measurement is greater than zero.

Returning to FIG. 3, a receipt of power via a second input feed may be determined (block 330). For example, input bus 220 may operate as a second input feed by receiving the power from the second power source. A second input of logic element 220 may receive input signal 216 from input bus 212. Logic element 220 may determine that the second input feed is receiving power when a value of input signal 216 is equal to the first particular value (e.g., 1). Logic element 220 may determine that the second input feed is not receiving power when the value of input signal 216 is equal to the second particular value (e.g., 0). A value associated with the receipt of power, via the second input feed, may equal the first particular value or the second particular value.

In another implementation, the second input, of logic element 220, may receive second power, as second input signal 216, from input bus 211. Logic element 220 may determine a second voltage measurement of the second power. Logic element 220 may determine that input bus 212 is receiving the power when the second voltage measurement is greater than zero.

Returning to FIG. 3, process 300 may further include determining whether both input feeds are receiving power (block 340). For example, logic element 220 may calculate a product based on the value of the first input signal (e.g., 0 or 1) and the value of the second input signal (e.g., 0 or 1). Logic element 220 may determine that the first input feed and the second input feed are receiving power when the product is equal to a first particular value (e.g., 1). Logic element 220 may determine that at least one of the first input feed and the second input feed is not receiving power when the product is equal to a second particular value (e.g., 0).

If both inputs are receiving power (block 340—YES), process 300 may include opening switch 230 (block 350). For example, switch 230 may be closed (FIG. 2B) before power is received (block 310). When logic element 220 determines that the first input feed and the second input feed are receiving power, logic element 220 may generate an output signal with an open control value (e.g., the product, which equals 1). Logic element 220 may transmit, via the output of logic element 220, the output signal to a control input of switch 230. Switch 230 may open (FIG. 2A) in response to the output signal with the open control value.

If both inputs are not receiving power (block 350—YES), process 300 may include closing switch 230 (block 355). For example, when logic element 220 determines that one of the first input feed and the second input feed is not receiving power, logic element 220 may generate an output signal with a close control value (e.g., the product, which equals 0). Logic element 220 may transmit, via the output of logic element 220, the output signal to the control input of switch 230. Switch 230 may close (FIG. 2B) in response to the output signal with the close control value. Thereafter, when power is restored to one of the first input feed and the second input feed from one of the power sources, process 300 may repeat and switch 230 may open.

Power may be provided via output bus 250 (block 360). For example, when switch 230 is open (FIG. 2A), DC/DC power supply 240 may receive, via input bus 210, power from the first power source, and DC/DC power supply 242 may receive, via input bus 212, power from the second power source. In other words, the PCB may receive, when switch 230 is open, a first part of an amount of power needed by the PCB via the first input feed and a second part of the amount of power needed by the PCB via the second input feed. A sum of the first part and the second pare may equal all of the power needed by the PCB.

When switch 230 is closed, DC/DC power supply 240 and DC/DC power supply 242 may receive all power from the same power source (e.g, the first power source or the second power source). One of DC/DC power supply 240 and DC/DC power supply 242 may receive the power via the closed switch 230 (FIG. 2B). In other words, the PCB may receive, when switch 230 is closed, all power needed by the circuit board via the first input feed or via the second input feed.

DC/DC power supply 240 and DC/DC power supply 242 may convert the received power into an output voltage. Output bus 250 may receive the output voltage from DC/DC power supply 240 and DC/DC power supply 242. Output bus 250 may transmit the output voltage to a portion/components of the PCB that utilize the output voltage.

Process 300 may repeat continuously as long as portion 200 receives power from at least one of the first power source or the second power source. Switch 230 may open when power is being received from both the first power source and the second power source. Switch 230 may close when power is being received from only of the first power source and the second power source.

The foregoing description of implementations provides illustration and description, but is not intended to be exhaustive or to limit the implementations to the precise form disclosed. Modifications and variations are possible in light of the above teachings or may be acquired from practice of these implementations.

For example, while a series of blocks has been described with regard to FIG. 3, the order of the blocks may be modified in other implementations. Further, non-dependent blocks may be performed in parallel.

While certain values have been used above (e.g., 0, 1), these values are merely provided as examples. In other implementations, the values may differ.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a logic element of a device, a first input signal from a first input feed of a circuit board of the device;
   receiving, by the logic element of the device, a second input signal from a second input feed of the circuit board;
   determining, by the logic element of the device and at a first time, that only one of the first input feed or the second input feed is receiving power based on the first input signal received by the logic element and the second input signal received by the logic element;
   generating, by the logic element of the device, an output signal with a close control value based on determining that only one of the first input feed or the second input feed is receiving power; and
   transmitting, by the logic element of the device, the output signal with the close control value to a control input of a switch of the circuit board,
   the switch being closed based on the output signal with the close control value.

2. The method of claim 1, further comprising:
   determining, at a second time, that both the first input feed and the second input feed are receiving power based on the first input signal received by the logic element and the second input signal received by the logic element; and
   opening the switch based on determining that both the first input feed and the second input feed are receiving power.

3. The method of claim 1, further comprising:
   determining that a value of the first input signal received by the logic element is equal to a first particular value, and
   determining that the first input feed is receiving power based on determining that the value of the first input signal received by the logic element is equal to the first particular value.

4. The method of claim 3, further comprising:
   determining that a value of the second input signal received by the logic element is equal to a second particular value, and
   determining that the second input feed is not receiving power based on determining that the value of the second input signal received by the logic element is equal to the second particular value.

5. The method of claim 1, where determining that only one of the first input feed or the second input feed is receiving power based on the first input signal received by the logic element and the second input signal received by the logic element comprises:
   calculating a product based on a first value associated with the first input signal received by the logic element and a second value associated with the second input signal received by the logic element, and
   determining that only one of the first input feed or the second input feed is receiving power based on the product.

6. The method of claim 2,
   where opening the switch comprises:
      transmitting another signal, with an open control value, to the switch, and where the switch opens based on the other signal with the open control value.

7. The method of claim 1, further comprising:
   receiving, when the switch is open, a first portion of an amount of power needed by the circuit board via the first input feed and a second portion of the amount of power needed by the circuit board via the second input feed,
   where a sum of the first portion and the second portion equals all of the amount of power needed by the circuit board.

8. The method of claim 1, further comprising:
   receiving, when the switch is closed, all power needed by the circuit board from the first input feed or from the second input feed.

9. A device comprising:
   a circuit board comprising:
      a first input bus,
      a second input bus,
      a switch to connect, when the switch is closed, the first input bus to the second input bus, and
      a logic element to:
         receive a first input signal from the first input bus,
         receive a second input signal from the second input bus,
         determine that the first input bus is receiving first power based on the first input signal,
         determine that the second input bus is not receiving second power based on the second input signal,
         generate an output signal with a close control value based on determining that the first input bus is receiving the first power and based on determining that the second input bus is not receiving the second power, and
         transmit the output signal with the close control value to a control input of the switch,
         the switch being closed based on the output signal with the close control value.

10. The device of claim 9, where the circuit board further comprises:
    a first power supply to receive the first power, via the first input bus, when the switch is open, and
    a second power supply to receive the second power, via the second input bus, when the switch is open.

11. The device of claim 10, where the circuit board further comprises:
an output bus to transmit an output voltage of the first power supply and the second power supply to components of the circuit board that utilize the output voltage.

12. The device of claim 10,
where the circuit board further comprises:
a first diode to connect an input of the first power supply to the first input bus, and
a second diode to connect an input of the second power supply to the second input bus, and
where the first diode and the second diode prevent shorting between the first input bus and the second input bus.

13. The device of claim 9, where, when determining that the first input bus is receiving the first input signal, the logic element is to:
determine a voltage measurement based on the first input signal,
determine that the voltage measurement is greater than zero, and
determine that the first input bus is receiving the first power based on determining that the voltage measurement is greater than zero.

14. The device of claim 9, where the switch remains open when the first input bus is receiving power and the second input bus is receiving power.

15. A logic element, of a printed circuit board (PCB), comprising:
a first input to receive a first input signal from a first input bus of the PCB,
a second input to receive a second input signal from a second input bus of the PCB, and
an output to transmit an output signal, based on the first input signal and the second input signal, to a control input of a switch that connects, when the switch is closed, the first input bus to the second input bus,
the output signal being generated by the logic element with a close control value when the first input signal received by the logic element indicates that the first input bus is receiving power from a first power source and the second input signal received by the logic element indicates that the second input bus is not receiving power from a second power source, and
the output signal closing the switch when the output signal is generated with the close control value.

16. The logic element of claim 15,
where a value of the first input signal is equal to a first particular value when the first input bus is receiving power from the first power source, and
where the value of the first input signal is equal to a second particular value when the first input bus is not receiving power from the first power source.

17. The logic element of claim 16,
where a value of the second input signal is equal to the first particular value when the second input bus is receiving power from the second power source, and
where the value of the second input signal is equal to the second particular value when the second input bus is not receiving power from the second power source.

18. The logic element of claim 15, where the close control value is equal to a product of a value of the first input signal and a value of the second input signal.

19. The logic element of claim 15, where the output signal comprises an open control value to open the switch when the first input signal indicates that the first input bus is receiving power from the first power source and when the second input signal indicates that the second input bus is receiving power from the second power source.

20. The logic element of claim 15,
where the output is further to:
transmit a new output signal, after transmitting the output signal that includes the close control value, when power is restored from the second power source to the second input bus, and
where the new output signal comprises an open control value to open the switch.

* * * * *